United States Patent [19]

Spicer

[11] Patent Number: 5,156,376
[45] Date of Patent: Oct. 20, 1992

[54] LAYING CABLES

[75] Inventor: Lyndon R. Spicer, Newport, United Kingdom

[73] Assignee: Standard Telephones and Cables Public Limited Company, London, England

[21] Appl. No.: 732,433

[22] Filed: Jul. 18, 1991

Related U.S. Application Data

[63] Continuation of Ser. No. 473,110, Jan. 31, 1990, abandoned, which is a continuation of Ser. No. 363,294, Jun. 7, 1989, abandoned, which is a continuation of Ser. No. 122,501, Nov. 17, 1987, abandoned, which is a continuation of Ser. No. 655,510, Sep. 28, 1984, abandoned.

[51] Int. Cl.⁵ .............................................. A61M 25/00
[52] U.S. Cl. ................................................... 254/134.4
[58] Field of Search .............. 254/134.3 R, 134.3 FT, 254/134.4; 350/96.23; 49/477

[56] References Cited

U.S. PATENT DOCUMENTS

| | | | |
|---|---|---|---|
| 252,956 | 1/1882 | Loane . | |
| 2,863,681 | 12/1958 | Robbins | 49/477 |
| 3,107,379 | 10/1963 | Hill | 254/134.4 |
| 3,179,375 | 3/1965 | Hamrick | 254/134.4 |
| 3,669,087 | 6/1972 | Hamrick et al. | 254/134.4 |
| 3,793,732 | 2/1974 | Hamrick | 33/137 R |
| 4,372,792 | 2/1983 | Dey et al. | 350/96.23 |
| 4,596,381 | 6/1986 | Hamrick | 254/134.4 |

FOREIGN PATENT DOCUMENTS

| | | |
|---|---|---|
| 2113903 | 8/1983 | United Kingdom . |
| 2119949 | 11/1983 | United Kingdom . |
| 2122367A | 1/1984 | United Kingdom . |

*Primary Examiner*—J. J. Swann
*Attorney, Agent, or Firm*—Kerkam, Stowell, Kondracki & Clarke

[57] ABSTRACT

A cable (C) is laid in a pipeline (10) by pushing the cable and (C') through a hydraulically variable diaphragm in an inlet tube (11). The end (C') of the cable has collapsible moulded cups (20) attached which can be pushed through the diaphragm and which erect themselves to act as a drag inducing device so that flowed liquid in the pipeline can be used to pull the cable and (C') towards an exit tube (12) downstream. A cable pusher (13) pushes the cable through the inlet (11). The cable has a specific gravity less than the liquid, preferably 0.7, which is substantially pressure independent.

4 Claims, 2 Drawing Sheets

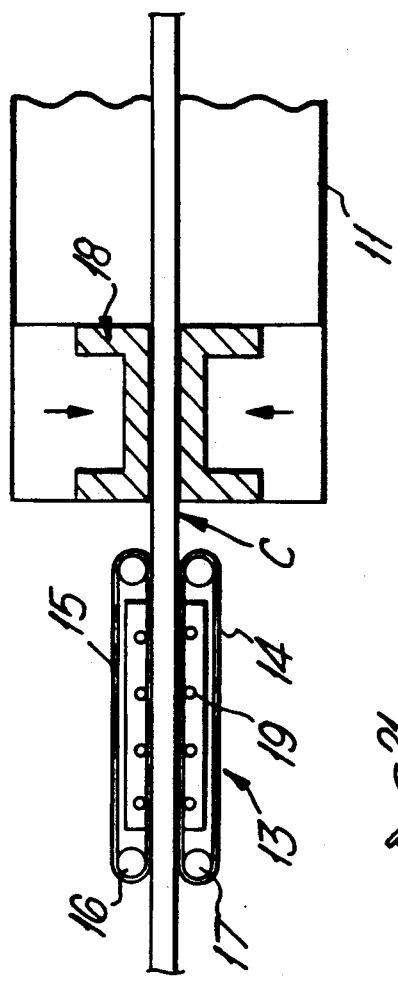
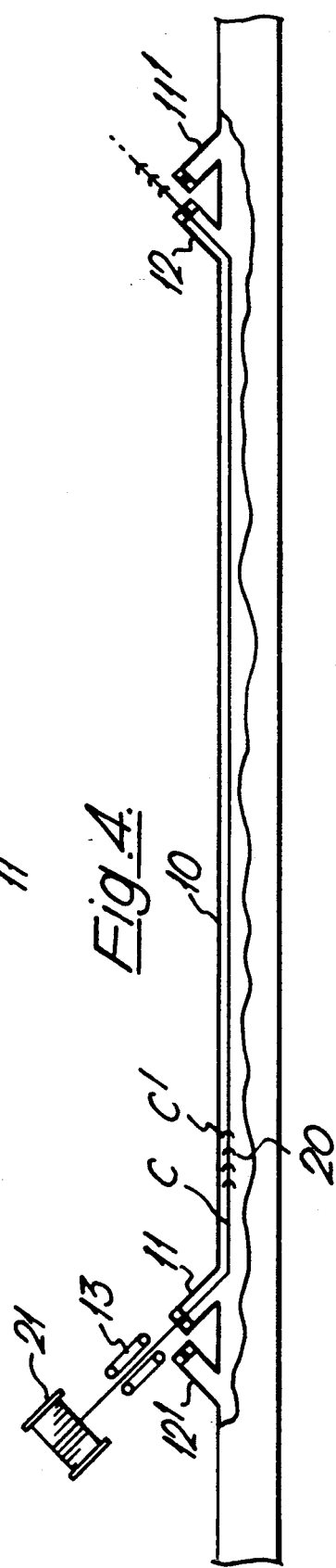
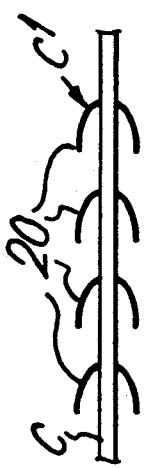

LAYING CABLES

This application is a continuation of Ser. No. 07/473,110 filed Jan. 31, 1990 (now abandoned), which was a continuation of Ser. No. 07/363,294 filed Jun. 7, 1989 (now abandoned), which was a continuation of Ser. No. 07/122,501, filed Nov. 17, 1987 (now abandoned), which was a continuation of Ser. No. 06/655,510 filed Sept. 28, 1984 (now abandoned).

This invention relates to laying cables in liquids particularly but not exclusively water.

There are certain circumstances under which it is required to lay cables in a duct or pipe which contains liquid and the present invention is concerned with overcoming problems which may arise in such environments.

According to the present invention a communication cable is laid in a duct or pipe containing liquid and has a specific gravity which is less than the liquid so that it floats on the liquid.

According to a further aspect of the invention there is provided a communication cable for laying in a pipeline containing liquid, the cable having a low density layer which renders it to float on the liquid, the cable density being substantially pressure independent.

Preferably the specific gravity of the cable lies in the range 0.5 to 0.9 that of the liquid, preferably 0.7.

Preferably the cable comprises one or more optical fibres surrounding a central strain member and enclosed in a solid plastics jacket which in turn is surrounded by a foamed plastics jacket, such as a syntactic foam.

Where the cable is laid in a pipeline containing liquid and which is required to be cleaned using a pig, the pig has a slot on one side large enough for the pipe to clean it without damaging the cable and without causing the cable to become jammed between the pig and the pipe wall.

According to another aspect of the invention the cable is laid in a pipeline while the pipeline contains a pressurised working liquid and is inserted through the pipeline wall via a valve and has a drag inducing device whereby the liquid will carry the cable in the direction of liquid flow.

Initially the cable is pushed throught the valve from outside the pipeline and can continue to be pushed during the laying operation although under some circumstances the drag inducing device may itself draw the cable throught the valve under the action of the working liquid.

In one embodiment the drag inducing devices comprise a plurality of moulded cups or "umbrellas" attached to the surface of the cable and which are flexible so that they collapse during passage throught the valve and are resilient so that they erect themselves once inside the pipeline or are erected by the force of fluid under them.

In order that the invention can be clearly understood reference will now be made to the accompanying drawings in which:

FIG. 4 shows schematically a pipeline in which the cable of FIG. 1 is being laid;

FIG. 5 shows schematically part of the cable of FIG. 4 on a larger scale and

FIG. 6 shows a detail of FIG. 4 on a larger scale.

Figure 1:
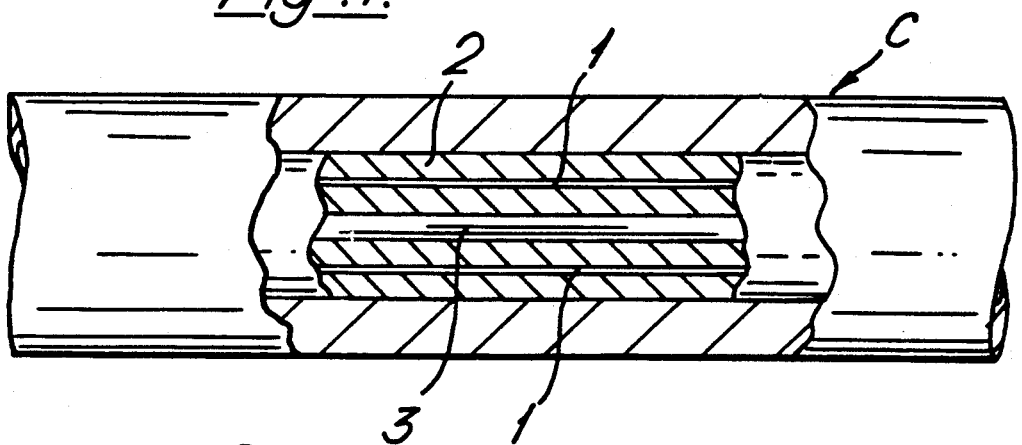
FIG. 1 is a longitudinal section of a fibre optic cable according to an embodiment of the present invention.
Figure 2:
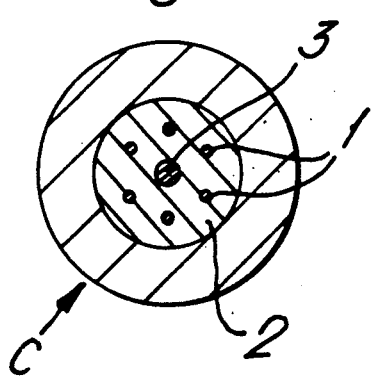
FIG. 2 is a transverse cross section of the cable of FIG. 1.

Referring to FIGS. 1 and 2, the cable C comprises eight optical fibres 1 embedded in polyethylene 2 around a king wire 3 of high strength plastics material such as Kevlar. It could alternatively be a metal wire. The optical fibres become partially embedded in the polythene 2a which is softened by heat allowing the optical fibres to form the interstices and just touch each other and the central strength member. Subsequently a polyethylene jacket 2b is extruded over, entering the outer interstices of the optical fibres and forming a solid polyethylene package with embedded optical fibres.

Such a cable as described thus far can be made by the arrangement and method described in our copending British Application No. 8200849 published on 10 Aug. 1983 as No. 2,113,903A and would have a specific gravity greater than unity so that it would sink in water. The cable is completely solid with no voids.

Over the polythene 2 is extruded a pressure independent syntactic foam sheath 4 which has a specific gravity significantly less than that of water and gives the cable an overall specific gravity of around 0.7. It would however be possible to have a greater or lesser specific gravity by changing the density of the syntactic foam or by making the syntactic foam proportion of the cable larger or smaller accordingly, if preferred.

A syntactic foam extrusion comprises e.g. polymethane mixed with tiny hollow glass spheres 5 which have a constant specific gravity with pressure, e.g. for example 1000 lbs/sq.inch; this mixture is applied to an extruder or continuous moulder, preferably with no moving parts so that the glass spheres are not damaged, and the cable is passed through the extruder to receive the buoyant extruder jacket, commonly referred to as a syntactic foam extrusion. In the embodiment described the cable polyethylene 2 would have an outer diameter of about 0.3 inches, the outer diameter of the syntactic foam being about 0.4 inches.

It is proposed to lay the cable in a liquid-filled pipeline even while the pipeline is in use to transport the liquid, and reference to FIGS. 4, 5 and 6 will show how this is to be accomplished.

The pipeline 10 has an oblique inlet tube 11 and an outlet tube 12 and the inlet and outlet are spaced say one or two kilometers apart. The inlet tube 11 is shown in greater detail in FIG. 6 and has a variable aperture through whichthe cable C is pushed by a caterpillar pusher 13. This comprises two rubber tracks 14 and 15 which are driven by drive wheels 16 and 17 over sets of support wheels 18 and 19 that squeeze the tracks and push the cable through the iunlet tube 11.

The variable aperture is formed by an hydraulically pressurised diaphragm whose aperture is variable in size by varying the hydraulic pressure applied. Thus the entry for the cable through the diaphragm can be adjusted to just fit the cable C to minimise leakage of liquid out from the pipeline.

Attached to the cable end C' is a set of moulded cups 20 which are moulded onto or otherwise attached to the outer sheath of the cable C. They act in the manner of an umbrella so that they collapse when squeezed by the caterpillar pushed and when pushed through the aperture of the variable diaphragm 18. The cups erect themselves, or are erected by the flow of liquid in the pipeline from the inlet 11 towards the outlet 13, and thus the flow of liquid "carries" the end portion C' of the cable C through the inlet diaphragm by the caterpillar pusher. The cable is unwound from a reel 21.

When the end C' of the cable is just short of the outlet 12, the outlet, which has a diaphragm similar to the diaphragm 18 on the inlet, is opened and the flow of liquid, through the outlet carries the cable end C' out through the outlet. The outlet diaphragm is then closed again and either connected to a transmission terminal or to the end of another cable which has been laid through the adjacent inlet 11' along the next adjacent length of pipeline. It could be connected directly to the other cable or via a regenerator for regenerating the information signals carried by the optical fibres.

In some circumstances it may be necessary to have cups 20 which are larger than those shown. In fact they could be same size as the internal bore of the pipeline if for example the flow of liquid is small. Then the cups would act as a "pig" and be driven at substantially the same speed as the liquid with small leakage past the cup peripheries.

Figure 3:
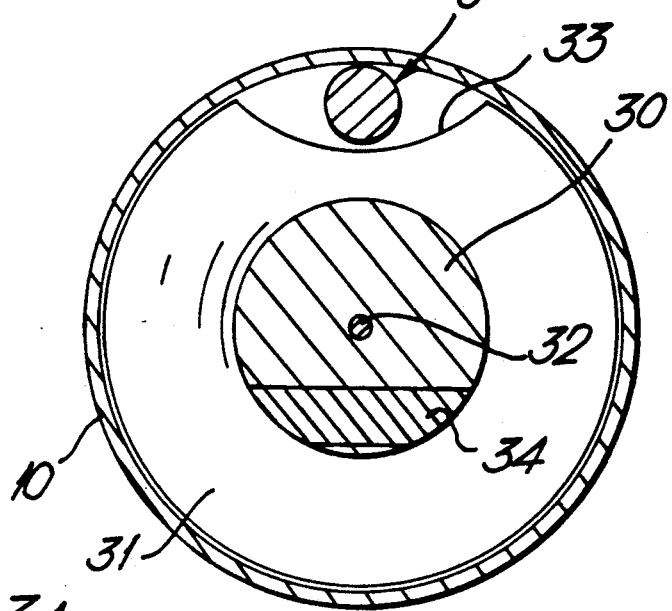
FIG. 3 shows schematically a cross section through a pipeline in which the cable of FIG. 1 has been laid, together with a cleaning pig.
Figure 3A:
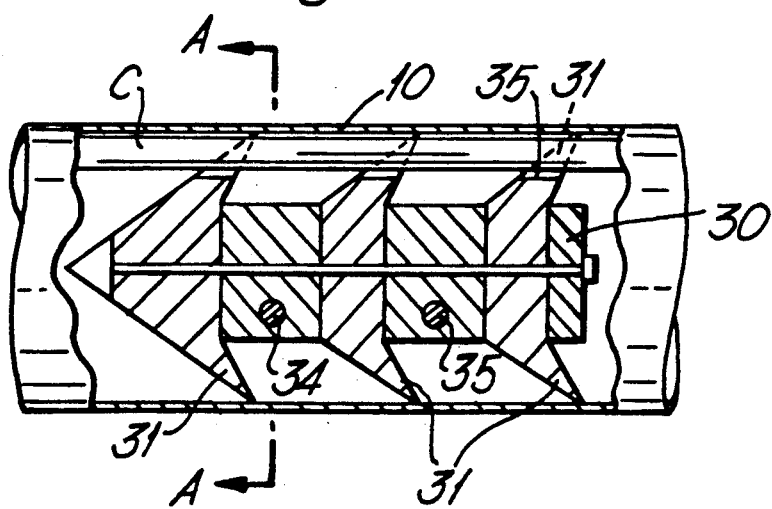
FIG. 3A shows a longitudinal section of the pig P of FIG. 3.

In some circumstances it will be necessary to periodically clean the pipeline while the cable is in situ. For this purpose a specially-designed "pig" P is shown in FIG. 3. Referring to FIGS. 3 and 3A the pig comprises a polymethane moulded body shaft 30, and three polymethane moulded cups 31. The shaft and cups are held together by a bolt and nut 32 and the peripheries of the cups have a shallow slot 33 so that the floating cable C will not be touched by the pig. To ensure that the pig remains in the pipe with the slot 33 uppermost, the pig is ballasted with two heavy slugs 34 and 35.

FIG. 3 shows the pig P fitted in a pipeline such as the pipeline 10 of FIG. 4 with the cable C in place.

I claim:

1. A method of installing a cable in a pipeline in which a liquid under a hydraulic pressure is flowing, which pipeline extends from a first location upstream to a second location downstream, the method comprising providing a cable having a syntactic foam pressure resistance sheath, providing an inlet tube on the pipeline sidewall at said first location, said inlet having means for sealing around the cable so as to inhibit leakage of liquid from the inlet tube, providing an outlet tube at said second location, said outlet tube having means for sealing around the cable so as to inhibit leakage of liquid from the outlet tube, providing the cable with one or more flexible cup members, said members being collapsible against the cable whereby to permit insertion through the sealing means into the pipeline, inserting and urging the cable through the inlet tube into the pipeline whereby the flowing liquid causes expansion of the cup member or members so as to provide a viscous drag both on the cup member or members and on the cable so as to draw the cable along the pipeline to the second location, and withdrawing the cable from the pipeline via the outlet tube so as to provide a length of cable within the pipeline between the first and second locations.

2. A method as claimed in claim 1 which comprises providing a cable which has a specific gravity lower than the liquid.

3. A method as claimed in claim 2, wherein the cable is pushed into the pipeline in addition to the urging caused by said liquid flowing until the end reaches an outlet point in the pipeline where the cable is to emerge.

4. A method as claimed in claim 1, which comprises providing on the pipeline a variable-diameter diaphragm which is controlled by adjusting a fluid pressure in the diaphragm, and passing the cable through the diaphragm to prevent leakage of said liquid.

* * * * *

UNITED STATES PATENT AND TRADEMARK OFFICE
CERTIFICATE OF CORRECTION

PATENT NO. : 5,156,376
DATED : October 20, 1992
INVENTOR(S) : Lyndon R. SPICER

It is certified that error appears in the above-identified patent and that said Letters Patent is hereby corrected as shown below:

In column 4, line 1 of Claim 3: delete "2" and insert -- 1 --.

Signed and Sealed this

Fifth Day of October, 1993

Attest:

BRUCE LEHMAN

*Attesting Officer*   *Commissioner of Patents and Trademarks*